(12) United States Patent
Barton

(10) Patent No.: US 6,442,479 B1
(45) Date of Patent: Aug. 27, 2002

(54) METHOD AND APPARATUS FOR A LOCATION SENSITIVE DATABASE

(76) Inventor: Patrick Barton, 1604 SE. 40th Ave., Portland, OR (US) 97214

( * ) Notice: Subject to any disclaimer, the term of this patent is extended or adjusted under 35 U.S.C. 154(b) by 0 days.

(21) Appl. No.: 09/450,626

(22) Filed: Nov. 30, 1999

Related U.S. Application Data

(60) Provisional application No. 60/110,910, filed on Dec. 4, 1998.

(51) Int. Cl.[7] .......................... G06G 7/78; G01C 21/00
(52) U.S. Cl. ....................... 701/213; 701/208; 701/209; 701/215; 342/357.06; 342/357.12; 342/357.13; 340/990; 340/995; 340/996
(58) Field of Search .................................. 701/200, 207, 701/208, 209, 210, 211, 212, 213, 215; 340/988, 990, 995, 991, 996; 73/178 R; 342/352, 357.01, 357.06, 357.12, 357.13

(56) References Cited

U.S. PATENT DOCUMENTS

| | | | |
|---|---|---|---|
| 4,654,879 A | | 3/1987 | Goldman et al. .............. 455/33 |
| 5,014,206 A | | 5/1991 | Scribner et al. ............. 364/449 |
| 5,317,323 A | | 5/1994 | Kennedy et al. ............ 342/457 |
| 5,512,908 A | | 4/1996 | Herrick ....................... 342/387 |
| 5,519,621 A | | 5/1996 | Wortham .................... 364/460 |
| 5,528,248 A | | 6/1996 | Steiner et al. .............. 342/357 |
| 5,613,205 A | | 3/1997 | Dufour ..................... 455/33.2 |
| 5,625,668 A | | 4/1997 | Loomis et al. ................ 379/58 |
| 5,751,228 A | * | 5/1998 | Kamiya et al. ............. 340/988 |
| 5,767,795 A | * | 6/1998 | Schaphorst ................. 340/998 |
| 5,835,061 A | | 11/1998 | Stewart ...................... 342/457 |
| 5,839,088 A | * | 11/1998 | Hancock et al. ............. 701/213 |
| 5,884,221 A | | 3/1999 | Wortham .................... 701/300 |
| 5,890,068 A | | 3/1999 | Fattouche et al. .......... 455/456 |
| 5,918,180 A | | 6/1999 | Dimino ...................... 455/456 |
| 5,938,721 A | | 8/1999 | Dussell et al. .............. 701/211 |
| 5,943,018 A | | 8/1999 | Miller ......................... 343/702 |
| 5,952,969 A | | 9/1999 | Hagerman et al. .......... 342/457 |
| 6,021,371 A | * | 2/2000 | Fultz ........................... 701/200 |
| 6,031,490 A | | 2/2000 | Forssén et al. ............. 342/457 |
| 6,034,626 A | * | 3/2000 | Mackawa et al. ........... 340/995 |
| 6,044,312 A | * | 3/2000 | Sudo et al. .................. 701/215 |
| 6,199,045 B1 | * | 3/2000 | Giniger et al. ................. 705/1 |
| 6,046,689 A | * | 4/2000 | Newman .................... 340/996 |
| 6,047,236 A | * | 4/2000 | Hancock et al. ............ 701/208 |
| 6,052,645 A | * | 4/2000 | Harada ....................... 701/212 |
| 6,073,075 A | * | 6/2000 | Kondou et al. ............. 701/203 |
| 6,078,865 A | * | 6/2000 | Koyanagi ................... 701/211 |
| 6,169,955 B1 | * | 1/2001 | Fultz .......................... 701/200 |

* cited by examiner

Primary Examiner—Jacques H. Louis-Jacques
(74) Attorney, Agent, or Firm—McDonnell Boehnen Hulbert & Berghoff

(57) ABSTRACT

Shown is a method and apparatus for a location sensitive database system. The database system includes a geographic positioning receiver, such as a global positioning system (GPS), and a database processor that receive the location values output by the positioning receiver. The database processor is coupled to a content database and searches the content database responsive to the current location values output by the positioning receiver. Database entries can also be obtained by the database processor sending a content query, which includes the current location values, over a wireless network link to a content server, which searches its own database for entries corresponding to the current location values and, if a matching entry is found, sends the content of the matching entry to the database processor for output to a user. Database entries can also be screened for a match on a user preference selected by a user of the device and based on the current time. The information in the database entries can take a variety of forms including audio and video data. The present system can be adapted to collect data on the user's movements and to collect for developing database content.

2 Claims, 9 Drawing Sheets

METHOD AND APPARATUS FOR A LOCATION SENSITIVE DATABASE

This patent application claims the benefit of provisional patent application 60/110,910 filed Dec. 4, 1998.

COPYRIGHT AUTHORIZATION

A computer program listing appendix containing an embodiment of a software program according to the present invention is included in this specification, the contents of which is incorporated herein for all purposes. The computer program listing appendix contains material that is subject to copyright protection. The copyright owner has no objection to the facsimile reproduction by anyone of the patent disclosure, as it appears in the Patent and Trademark Office patent files or records, but otherwise reserves all copyrights whatsoever.

FIELD OF INVENTION

The present invention relates to geographic positioning systems and databases.

BACKGROUND OF THE INVENTION

Geographic positioning technology, such as the Global Positioning System (GPS), involves the use of a constellation of satellites in low Earth orbit and extremely accurate clocks to provide information necessary to determine the location of the receiving device. The United States maintains one such constellation of satellites that is available to the military and other users.

A typical GPS device incorporates a receiver circuit for receiving signals from satellites and a processor that interprets the received signal in order to determine the GPS's location relative to the satellites. Based upon the delay between the time signals that are sent by the satellites and the time that the signals are received, the distance between each of the satellites and the GPS receiver can be determined. Calculations based upon the distance between the receiver and the satellites can then be used to determine the receiver's position and report it in terms of latitude, longitude, and altitude.

FIG. 1 illustrates an example of a typical GPS system 50. A GPS receive and decode circuit 20 includes a four-channel receiver 24 coupled to an antenna 22 that receives signals from satellites 10A, 10B, 10C and 10D. Responsive to the signals from satellites 10A and 10B, receiver 24 outputs a signal to decoder processor 26 that decodes the signals received from the satellites in order to generate a location signal 28. The location signal 28 is output from GPS receive and decode circuit 20. The location signal 28 may be further processed by interface processor 30 in order to generate a display signal 32 that drives a display 40 in order to output the location information from the satellites in a format useful to a user of the GPS.

GPS devices determine location by measuring the distance of the GPS device from four satellites of the constellation of satellites place in orbit. The satellites orbit at an altitude of 11,000 miles and all transmit a precise timing signal at the same carrier frequency. However, each satellite also transmits a unique pseudo-random code pattern that uniquely identifies the transmitting satellite. The GPS device therefore requires a four-channel receiver circuit to receive the signal from each satellite.

Decoder processor 26 maintains data on the location and pseudo-random code pattern for each transmitting satellite. The decoder determines its location by triangulating the distance values from the known position of each satellite. This requires the decoder processor 26 to select widely spaced satellites and measure their distance from the receiver by measuring a delay in the signal sent by each satellite. Once the distance of the GPS receiver 50 to each of the satellites is determined, then the processor 26 calculates the intersection of the sphere around each satellite having a radius equal to the distance of the satellite from the receiver. Typically two location values are obtained, one of which can usually be eliminated by assuming that receiver 50 is on the surface of the earth.

In order to compensate for an imperfect clock reference in the GPS receiver 50, the measurement to the fourth satellite is made in order to determine a correction factor that can be applied to the measurements involving the other three satellites. In addition, the decoder processor 26 may also compensate for atmospheric effects that can change the speed of the timing signals, such as by using a fixed model of the effect of the atmosphere or by performing a differential comparison of the atmosphere's effect on signals having different frequencies. Furthermore, the timing signal from each satellite also includes corrected position information for the satellite to compensate for changes in the satellite's orbit that processor 26 will process. GPS receiver 50 will also need to perform signal rejection in order to counteract ground effects caused by reflection of the timing signals from objects such as buildings and mountains.

The end result is that GPS receiver 50 outputs a digital value from processor 26 that represents the location of the receiver. Conventional satellite positioning systems are typically configured to report a user's location via a numeric display. While this information is useful for navigation, it is limited in its overall utility since it simply displays the navigational coordinates of the user's location, or similar information, and does not relate the location to important characteristics of the user's location.

Other applications of GPS technology have resulted in equipment that can store a predetermined point, such as a user's earlier position, a destination point, or another predetermined point, and, in combination with the current location, provide the cardinal direction the user must travel to move from the current location to the predetermined point. While this approach works well to enable a user to find the predetermined point, the system is unable to provide much additional information about the user's location except for its position.

There exist useful sources of additional information regarding particular locations and their surroundings. For instance, maps have been available for centuries and are useful aids in orientation and trip planning. However, maps require a user to determine where they are located on the map and interpret the information contained in the map. Guide books also provide useful and detailed information about locations but also require the user to know where he is in order to extract the correct information from the books. Cassette tapes can provide tour-guide information, but the user is constrained to following the route determined by the sequence of locations referenced on the cassette tape.

Still other conventional devices combine location information with a map and the ability to provide directions to user-specified destinations. This technology is limited because it does not have the capability to provide additional informational content about passing locations, has no ability to allow the user to select content, and has no ability to update the content provided based upon the user's references.

Therefore, the need remains for an approach that permits a user's position to be coordinated with additional useful information relating to that position.

SUMMARY OF THE INVENTION

In accordance with preferred embodiments of the present invention, some of the problems associated with the use of geographically oriented information are overcome.

One aspect of the present invention includes a location sensitive method for outputting data from a database. The method includes the steps of receiving a current position value and searching a database for a database entry corresponding to the current position value. If a corresponding database entry is found, the method calls for outputting a contents of the corresponding database entry.

An embodiment of a location sensitive database apparatus, according to the present invention, includes a positioning system, configured to receive geographical reference signals and, responsive thereto, generate a location signal indicating a geographical position of the positioning system, and a content database configured to store database entries, each database entry corresponding to a geographic region and including machine readable data. The apparatus also has an output display configured to receive the machine readable data and output the machine readable data in a human recognizable format. A database processor of the apparatus is configured to receive the location signal from the positioning system and, responsive thereto, search the content database for a corresponding database entry where the geographic region of the corresponding database entry matches a current value of the location signal. If the database processor finds the corresponding database entry, it transfers the machine readable data for the corresponding database entry to the output display.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

The present invention relates to a method and apparatus for correlating user location information to the contents of a database. The present invention provides for location-sensitive and time-sensitive information acquisition and delivery based upon the output of a mobile satellite positioning systems, such as a GPS. The invention disclosed herein overcomes many of the limitations of the prior art by providing for communication of information to a user that is sensitive to the user's location, the time, the user's preferences, the user's recent itinerary, or a combination of these factors.

The present invention utilizes a mobile satellite positioning system to acquire satellite positioning signals and process the signals into a series of current positions and times. The present invention then uses the current position information to search a database for an entry corresponding to the current position information and, if an entry is found, output the content of the entry to a user. For instance, one aspect of the present invention is a platform that can narrate a geological history of a scenic drive, or that can provide multi-media descriptions of historical events relevant to particular areas. Another aspect of the present invention captures the user's geographical position at frequent intervals and then, based on the location, such as stores, motels, restaurants, etc., stores the location in the database for later retrieval and analysis.

Figure 1:
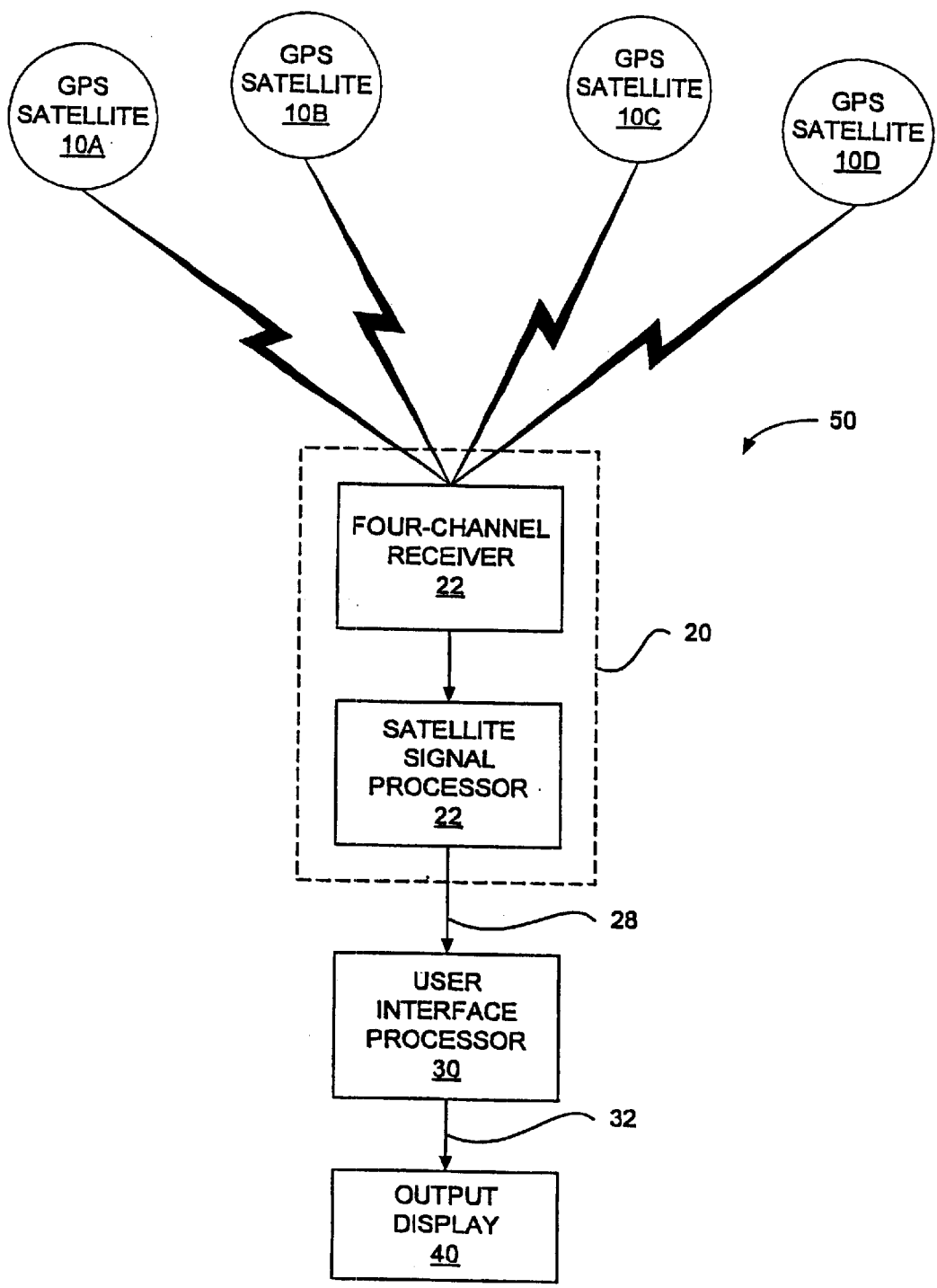
FIG. 1 is a block diagram illustrating an example of a conventional GPS device.
Figure 2:
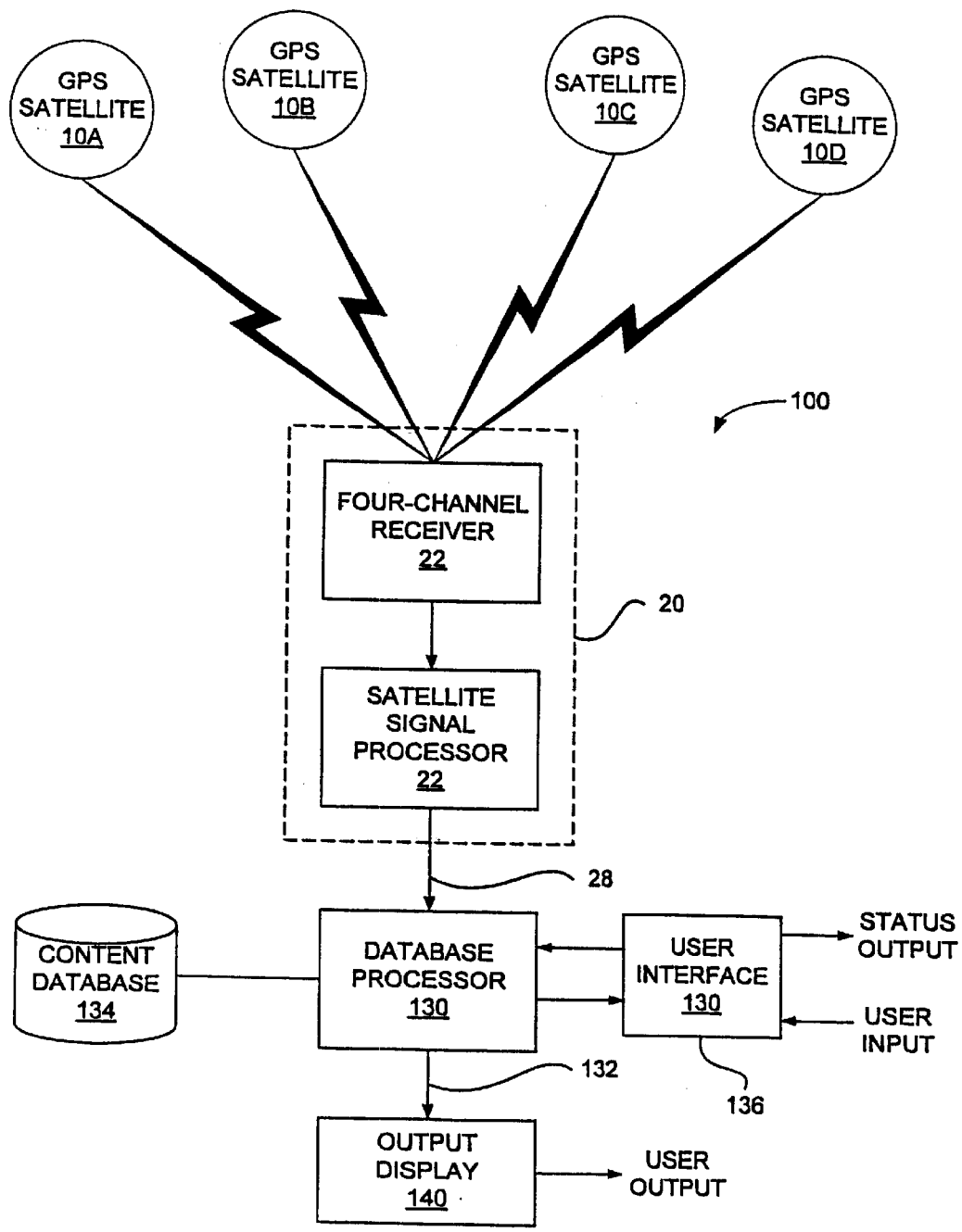
FIG. 2 is a functional block diagram illustrating an architecture for one embodiment of a GPS device according to the present invention.

FIG. 2 is a functional block diagram illustrating an architecture for one embodiment of a GPS device 100 according to the present invention. GPS device 100 includes GPS receive and decode circuit 20 that is coupled to database processor 130. As in FIG. 1, the location signal 28, which reflects the current latitude and longitude, is output from GPS receive and decode circuit 20 to database processor 130. Database processor 130 is coupled to content database 134 from which it obtains database entries for output to output display 140. User interface 136 receives user input from a user of GPS device 100 and forward the user input to database processor 130. In addition, database processor 130 outputs status information, such as the present latitude and longitude information from GPS receive and decode circuit 20, to user interface 136 for display to the user.

GPS device 100 is initialized when a user command to start operation is input via user interface 136. Once initialized, database processor 130 processes the latitude and longitude values of the location signal 28 by searching database 134 for an entry corresponding to the current value of the location signal. If an entry is found and the entry has not been output yet to the user, then the content of the entry is output to output display 140. Processor 130 may also screen the database entries output to the user on the basis of user preference values input to user preference buffer 136.

The content of each database entry is preferably audio data, such as a wave file, that is used to drive a speaker that is at least part of the output display 140. However, database entries can take other forms, such as text or video files that are output to the user through an appropriate type of output display 140.

Table 1 below illustrates an example of an embodiment of a table of database entries for set of entries stored in database 134. This table is used by database processor 130 to search and index to content entries in database 134. In one embodiment of the present invention, Table 1 is pre-constructed by a developer creating the content entries in database 134 and the Table is stored in database 134 along with the entries that it indexes.

In Table 1, LAT1, LAT2, LONG1 and LONG2 represent the geographic boundaries, in latitude and longitude, respectively, for each database entry or "cell". Pre-constructing the database gives the content developer great flexibility in determining the size and overlap of the cells within the database. The CONTENT TYPE field is an enumerated domain determined by the content developer where each value indicates the type of content for the entry for use with user preferences as further described below. The TRACK field is an index to database 134 where the database entry for the cell can be found.

TABLE 1

| LAT1 | LAT2 | LONG1 | LONG2 | CONTENT TYPE | TRACK |
|---|---|---|---|---|---|
| X | X | X | X | HISTORY | cell1e |
| X | X | X | X | GEOLOGY | cell2ae |
| X | X | X | X | COMMERCIAL | cell2be |
| X | X | X | X | HISTORY | cell3ae |
| X | X | X | X | ECOLOGY | cell3be |

Note that a similar approach to that described for latitude and longitude values or the content type for database entries can be applied to assigning a time interval to a database entry. In this approach, the database processor checks whether a database entry matches the current geographical position output by the GPS receive and decoder and also checks whether the database entry matches the current time by comparing the time interval of the database entry to a time signal provided by a clock circuit or other source. A database entry matching the current location and time would be output. Thus, a database entry matching the location of a restaurant and a meal time could be output to a user.

Table 2 illustrates pseudo code that describes the function of an embodiment of the database processor 130. The pseudo code example contemplates a user interface having Begin and End buttons for starting and stopping the system according to the present invention. The user interface also includes a textual output display for indicating the latitude and longitude values output by the GPS receive and decode circuit 20. The pseudo code also contemplates one or more background entries to be output during times when there are no unplayed cells in database 134 that match the current latitude and longitude of the device.

TABLE 2

© 1999 by Patrick J. Barton.
Initialize System
    Initialize CPS receiving hardware
    Reset "already played" flags
    Set up user interface panel
        Begin and End buttons
        Latitude and Longitude Display Fields
        Current Cell Display Field
        Button for Playing Background Content option
    Open Position Log File (or establish Client/Server relationship for position data)
    Initialize Content Database
    Initialize Background Database
While Not Ended
    Gather Position Data
        Read last line of log file (or query server) for current position
        Determine direction of travel
    Determine associated cell
    Check status of current cell
    If playing
        Then
            go to top of loop
    If already played
        Then
            Check if user wants background content
            If user wants background content
                Then
                      Find next unplayed background segment
                      If there are no unplayed background segments
                          Then go to top of loop
                      Deliver next unplayed background segment
                      Set "already played" flag for current background segment
                Else
                    Go to the top of loop
    If not played
        Then
            Deliver content for current cell
            Set "already played" flag for current cell
    Check if End button is pushed The computer program listing appendix herewith submitted and incorporated by reference illustrates source code for an embodiment of the database processor 130. The source code is in the Pascal programming language and is designed to retrieve and output database entries composed of audio wave files.

TABLE 3

© 1996, 1998 by Patrick Barton
    unit mp30main;
    {$o-} {$i+}
    interface
    uses
        Windows, Messages, SysUtils, Classes, Graphics, Controls, Forms, Dialogs,
        MPlayer, StdCtrls, Spin, DB, DBTables, Grids, DBGrids, ExtCtrls, DBCtrls,
        DdeMan, FileCtrl;
    type
        TCDMusic = class(TForm)
        Sounds: TMediaPlayer;
        InitButton: TButton;
        LatLabel2: TLabel;
        LongLabel2: TLabel;
        Label4: TLabel;
        LocDBGrid1: TDBGrid;

TABLE 3-continued

```
    Locdata1: TDataSource;
    LocTable1: TTable;
    PrograrmRunning: TButton;
    PositionValid: TButton;
    showpositionvalid: TLabel;
    StopButton: TButton;
    NextBackground: TButton;
    Label2: TLabel;
    Timer1: TTimer;
    latlable1: TLabel;
    longlabel3: TLabel;
    latlabel: TLabel;
    longlabel: TLabel;
    Textout: TButton;
    init: TButton;
    GetLatLong: TButton;
    Directionlabel: TLabel;
    cellwerein: TLabel;
    DBaseEdit: TEdit;
    SoundFileEdit: TEdit;
    DatabaseFile: TLabel;
    Label1: TLabel;
    DataButton: TRadioButton;
    procedure InitButtonClick(Sender: TObject);
    procedure PositionValidClick(Sender: TObject);
    procedure GetLatLongClick(Sender: TObject);
    procedure ProgramRunningClick(Sender: TObject);
    procedure StopButtonClick(Sender: TObject);
    procedure TextOutClick(Sender: TObject);
    procedure InitClick(Sender: TObject);
    procedure NextBackgroundClick(Sender: TObject);
    procedure DataButtonClick(Sender: TObject);
private
    { Private declarations }
public
    datetime: string;
    size: longint;
    ffile: file of char;
    bbuf: longint;
    ccount: integer;
    f: file of char; {textfile}
    s, textoutput, atime, alat, along: string;
    i, j, count, transferred: integer;
    stuffread: array [1 . . . 12] of string;
    charread: ansichar;
    chararray: array [1 . . . 12] of ansichar;
    rawlat, rawlong, latitude, longitude, templat, templong: double;
    deltalat, deltalong: double;
    lastback, found: integer;
    track, lasttrack: integer;
    cellname, trackname, filename, direction: string;
    end;
var
    CDMusic: TCDMusic;
    lat, long, latincr, longincr: single;
    lat1, lat2, long1, long2: double;
    ispositionvalid: integer;
    running, stopprogram: integer;
implementation
{$R*.DFM}
procedure TCDMusic.InitButtonClick(Sender: TObject);
begin
    loctable1.tablename := dbaseedit.text;
    loctable1.active:=true;
    {go to the beginning of the location data table}
    loctable1.first;
    while not loctable1.eof do begin
    {initialize the settings to indicate none of the tracks are played}
    loctable1.edit;
    loctable1.fieldbyname('track').asinteger := 0;
    loctable1.post;
    loctable1.next;
    end;
templat:=45;
templong:=122;
lastback:=20;
found:=0;
{application.processmessages;}
sounds.devicetype := dtwaveaudio;
```

TABLE 3-continued

```
    init.click;
    {find the latitude and longitude}
    getlatlong.click;
    programrunning.click;
end;
procedure TCDMusic.PositionValidClick(Sender: TObject);
var latvalid, longvalid: integer;
begin
latvalid :=0;
longvalid:=0;
isPositionValid := 0;
    if( lat1 <= lat2) then
        if(latitude >= lat1) and (latitude < lat2) then
            latvalid := 1;
        if(lat1 > lat2) then
            if(lat1 >= latitude) and (lat2 < latitude) then
                latvalid :=1;
    if( long1 <= long2) then
        if(longitude >= long1) and (longitude < long2) then
            longvalid := 1;
    if(long1 > long2) then
        if(long1 >= longitude) and (long2 < longitude) then
            longvalid := 1;
    if(latvalid = 1) and (longvalid = 1) then IsPositionValid:= 1;
    ifispositionvalid = 1 then
        showpositionvalid.caption:= 'valid'
        else showpositionvalid.caption:= 'not valid';
end;
procedure TCDMusic.GetLatLongClick(Sender: TObject);
begin
{$I+}
try
    assignfile(f, 'c:\unitrack\dogma.bin');
    except s:="; end;
    filemode:=0;
    reset(f);
    size := FileSize(f);
    Seek(f, size-12);
    textout.click;
end;
procedure TCDMusic.ProgramRunningClick(Sender: TObject);
begin
{first, initialize everything}
getlatlong.click;
running :=1;
timer1.enabled:=true;
programrunning.caption := 'Running';
ispositionvalid := 0;
{main program loop; query for location, find and play audio files}
while stopprogram <> 1 do
    {as long as the user hasn't hit "stop" . . . }
    begin
    if found = 0 then nextbackground.click;
        found:=0;
        init.click;
            {run through the data base to try to find a valid cell}
            loctable1.first;
        while not loctable1.eof do
        begin
            {application.processmessages;}
            loctable1.next;
            {get valid boundarys for this cell}
            lat1:=LocTable1.FieldByName('lat1').Asfloat;
            lat2:=LocTable1.FieldByName('lat2').Asfloat;
            long1:=LocTable1.FieldByName('long1').Asfloat;
            long2:=LocTable1.FieldByName('long2').Asfloat;
            {find out if we are in this location}
            positionvalid.click;
            ifispositionvalid = 1 then
                {we have audio content for this location}
                begin
                    {find the last track played for this cell}
                    lasttrack := loctable1.fieldbyname('lasttrack').asinteger;
                    track := loctable1.fieldbyname('track').asinteger;
                    found:=1;
                    if track >= lasttrack then
                        {we've played it already}
                        begin
                            nextbackground.click;
```

TABLE 3-continued

```
            continue;
        end;    {iflasttrack}
    {If we're here, we have an unplayed track}
    track := track + 1;
    {ID the name of the sound file: CELLxxx[Txx].WAV}
    trackname := 'T'+ inttostr(track);
    cellname := loctable1.fieldbyname('cellname').asstring;
    {filename := 'c:\madprof\audio\'+cellname+direction+'.wav';}
    filename := soundfileedit.name+cellname+direction+'.wav';
    cellwerein.caption:=cellname;
    if fileexists(filename)
        then begin
            showpositionvalid.caption:=cellname;
            {play the sound file and wait until it's finished}
            sounds.filename := filename;
            sounds.open;
            sounds.notify := true;
            sounds.wait:=true;
            sounds.play;
            {now, update the database to reflect just-played track}
            locdata1.edit;
            with loctable1 do begin
            loctable1.fieldbyname('track').asinteger := track;
            loctable1.post;
            end; {with table}
        end {if file exists}
        else nextbackground.click;
        {reset the "valid position" flag}
        ispositionvalid:=0;
    end; {position valid}
    end; {while not at end of location data}
    if found = 0 then nextbackground.click;
    application.processmessages;
  end; {while program not stopped}
  {finally, make sure that the sound object is closed}
  sounds.close;
end;
procedure TCDMusic. StopButtonClick(Sender: TObject);
{allows user to terminate the program gently}
begin
loctable1.active:=false;
stopprogram := 1;
try
    begin
        sounds.close;
        end; {try}
    except beep;
    end; {except}
// exit;
end;
procedure TCDMusic.TextoutClick(Sender: TObject);
var
ttime:longint;
    ordarray: array [1 . . . 12] of integer;
    i, j: longint;
    s:string;
    oldlat, oldlong:string;
begin
    //beep;
    transferred:=0;
    fori := 1 to 12 do
    begin
        read(f, charread);
        chararray[i]:=charread;
        j:= ord(charread);
        ordarray[i]:=j;
        end; {do}
    ttime:= (ordarray[1] + ordarray[2]*256+
        ordarray[3]*256*256 + ordarray[4]*256*256*256);
datetime:=floattostr(ttime/(100/60/60));
rawlat:= ordarray[5]*1 + ordarray[6]*256 +
        ordarray[7]*256*256 + ordarray[8] * 256*256*256;
latitude := rawlat/(100*60*60);
rawlong:= ordarray[9]*1 + ordarray[10]*256 +
        ordarray[11]*256*256 + ordarray[12] * 256*256*256;
longitude:=360-rawlong/(100*60*60);
{now, figure out which direction we are moving in}
deltalat:= latitude-templat; {deltalat > 0, we are moving north[something]}
deltalong:= longitude-templong; {deltalong > 0, we are moving west[something]}
```

TABLE 3-continued

```
{for the columbia gorge prototype, we will use E/W as the dominant direction}
if deltalong > 0 {we are going west [something] }
   then begin
       direction := 'w';
       directionlabel.caption:='westbound';
       end {begin clause}
   else begin
       direction := 'e';
       directionlabel.caption:='eastbound';
       end; {if then else}
{reset our last latitude and longitude observations}
templong:=longitude;
templat:=latitude;
{peel off insignificant digits}
oldlat:=latlabel.caption;
oldlong:=longlabel.caption;
str(latitude:8:5,s); latlabel.caption:=s;
str(longitude:8:5,s); longlabel.caption:=s;
if oldlat <> latlabel.caption
   then
       begin {values changed}
       //beep; beep; beep;
       oldlat := latlabel.caption;
       end;
   if oldlong <> longlabel.caption
       then
          begin
             //beep;beep;beep;
             oldlong := longlabel.caption;
             end;
       end;
procedure TCDMusic.initClick(Sender: TObject);
begin
{$I+}
try
   assignfile(f, 'c:\unitrack\dogma.bin');
   except s:=''; end;
   filemode:=0;
   reset(f);
   size := FileSize(f);
   Seek(f,size-12);
   textout.click;
end;
procedure TCDMusic.NextBackgroundClick(Sender: TObject);
begin
//    application.processmessages;
//    lastback:=lastback+1;
//    str(lastback,s);
//    cellname := 'back'+ s;
//    filename := 'c:\madprof\audio1r\'+cellname+'.wav'; {upgrade to include track later}
//    showpositionvalid.caption:=cellname;
//    if fileexists(filename) then begin
//    {play the sound file and wait until it's finished}
//    sounds.filename := filename;
//    sounds.open;
//    sounds.notify :=true;
//    sounds.wait:=true;
//    sounds.play;
       //found:=1;
//    end; {if fileexists}
end;
procedure TCDMusic.DataButtonClick(Sender: TObject);
begin
{if databutton.checked = true then
   begin
       locdbgrid1.visible:=false;
       databutton.checked := false;
       end
   else {button is not checked}
   { begin
       locdbgrid1.visible:=true;
       databutton.checked := true;
       end;} {if then else}
end;
end.
```

Table 3 illustrates an example, in terms of narrative text, of a set of database entries in database 134 for a number of cells. The example relates to locations along the Columbia River Ga. near Troutdale, Oreg. Each entry corresponds to a combined latitude and longitude value and contains a wave file that can be transformed into an audio signal containing the narration shown in the figures.

TABLE 4

©1996, 1998 by Patrick J. Barton
cell1e

"We're now entering the main street of old town Troutdale. On the north side of the street, you'll see the Caswell Gallery, a regionally important brass foundry, and on the south side, the Handy Bros gas station founded in 1920. As we go through the downtown area we'll see a lot of gentrification. Historical renovation has a strong emphasis here in Troutdale as the tourism industry has increased. At one end of town, you'll see the east bank of the Sandy River. It forms a substantial gorge we'll see down the road just a little bit. As you pass over the rise at the end of the town you'll see an old railroad station."
cell2ae "Captain John Harlow, the founder of Troutdale, wanted a railroad depot to be built in his new town. The railroad declined because of costs. When they refused, Captain Harlow became vindictive, sailed a small boat up the Sandy, and had the river declared navigable."
cell2be "Because the river had been declared navigable, the railroad was required to put in a very expensive drawbridge where they wanted to put in a simple trestle. In exchange for dropping the demand for a drawbridge, Harlow got his rail station, which was moved here from its original location nearby and now serves as one of the town's two fine museums."
cell3ae "The two story clabboard building to the south is the Harlow House, built in 1900."
cell3be - 0:06

"The Troutdale Historical Society has carefully restored the house and built a period barn. It's now open to the public as a museum."
cell4ae "The bridge that you see is a 364 foot long span over the Sandy River built by Multnomah county in 1912 under the direction of Samuel Lancaster, the architect of the gorge highway. It is one of the oldest Pratt-truss steel bridges in Oregon. It serves as the western gateway to the Columbia River Highway National Historic District. The dilapidated building on the right is an abandoned gas station built in 1929, and it's architecturally significant because of the portico in front, and serves as a archetype of the gas stations that dotted the Columbia River Highway in the 1920's."
cell4be "If you look off to the north you'll see the point where on October 30$^{th}$, 1792, off the point in the Columbia River where the Sandy empties, a boat crew from the HMS Chatham, one of Vancouver's boats, were the first non-native men to sight the snow clad peak which Lt. Wm. Broughton named Mt. Hood in honor of Vice Adm. Samuel Lord Hood of the British Navy. He called this stream Bearings River. Later in Nov. 1805 Lewis & Clark called it the Quicksand River, and still later, by common use, it became known as the Sandy River. If you have extra time, particularly in the springtime when there's a steelhead run, it is recommended that you try your hand at fishing. Fly-fishing for trout is good at any time of the year, and the river is open at any time of the year, although angling restrictions apply."

When GPS receive and decode circuit 20 outputs current values for latitude and longitude to database processor 130, the processor will search the table of entries, Table 1, and, for example, find that the current values for latitude and longitude fall within the parameters of LAT1, LAT2, LONG1 and LONG2 for the database entry for cell1e. Using the TRACK value from the table of database entries, processor 130 will go to the location of the entry for cell1e in database 134 and being streaming the audio data from the entry to output display 140, where, in this example, the output display includes an audio output system. Processor 130 will continue to stream the audio data from the database entry for cell1e until it reaches the end of the entry, i.e. the end of the wave file. The database processor 130 is then checks the output values of the GPS receive and decode circuit 20 and repeats the process so long as GPS device 100 remains operational, i.e. not stopped or powered down by the user.

Alternatively, a particular value of latitude and longitude can be associated with each database entry and database processor 130 can be programmed to determine whether the current values for latitude and longitude from GPS receive and decode circuit 20 are within a predetermined range or buffer zone of the latitude and longitude values for a database entry.

Figure 3:
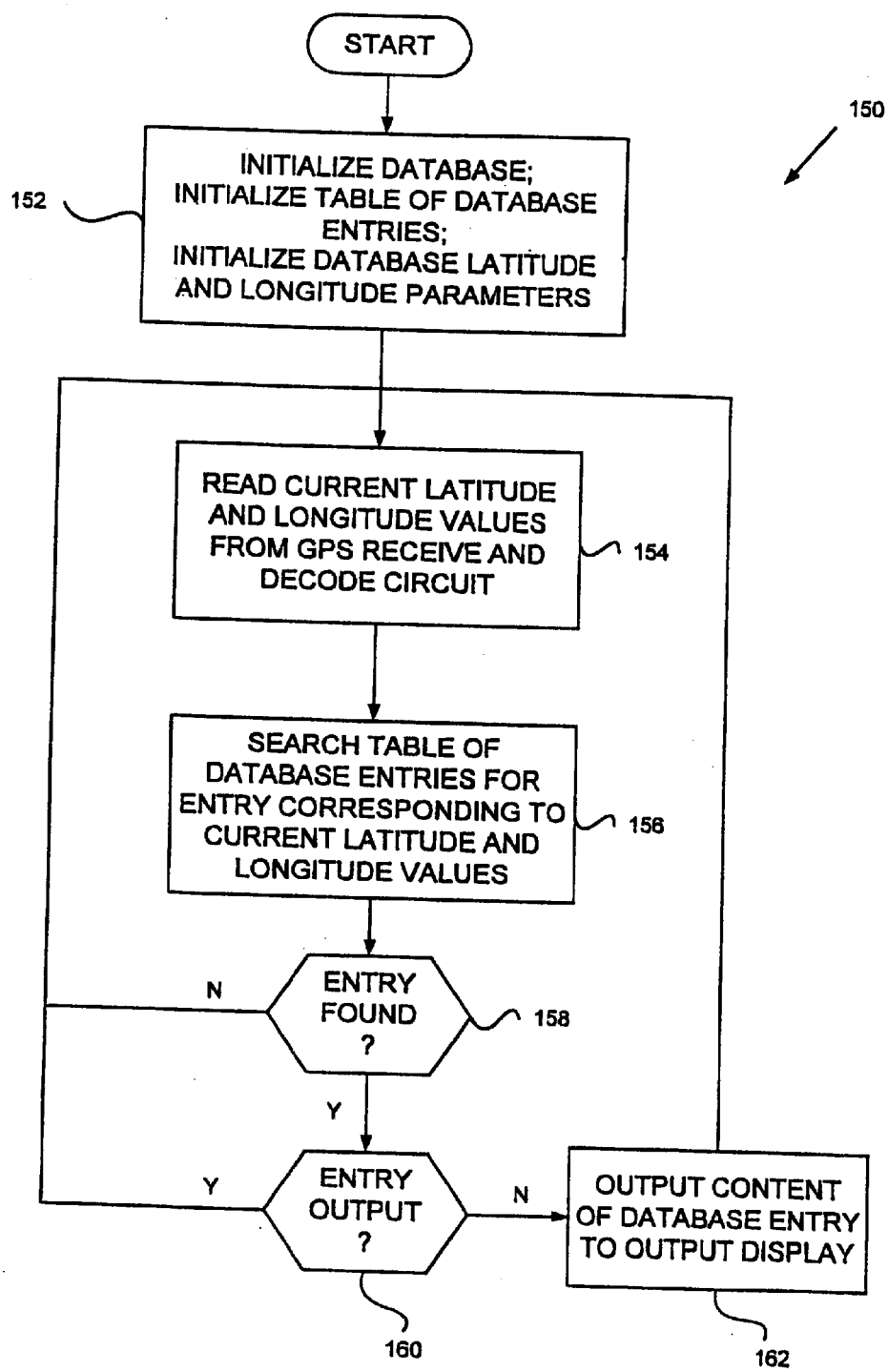
FIG. 3 is a control flow diagram illustrating an embodiment of a process performed by the database processor of FIG. 2.

FIG. 3 is a control flow diagram illustrating an embodiment of a process 150 performed by database processor 130 directed toward this alternative approach. The processor initializes database 134, establishing search pointers, etc, initializes a table of database entries, and initializes database latitude and longitude parameters. The table of database entries simplifies the search for entries and includes latitude and longitude values relating to each database entry and the location within database 134 for each entry. The table can be pre-constructed and stored in database 134 prior to when the database is constructed or can be constructed by processor 130 as part of initialization.

At step 154, processor 130 reads the current latitude and longitude values generate by the GPS receive and decode circuit 20. Using the current latitude and longitude values, the processor searches the table of database entries at step 156 for an entry within a buffer zone of the current latitude and longitude values from circuit 20. It may be desirable to establish a buffer zone around the current latitude and longitude values, rather than relying on an exact match, such that an entry corresponding to a combination of latitude and longitude falling within the zone results in a match.

If an entry is not found at step 156, then control flow branches at step 158 back to step 154. If an entry is found, then control flow branches to step 160 where the matching entry is checked to see if it has been output to the user already. The table of database entries can include a status field to indicate whether the entry is played or other approaches can be employed to maintain status for each entry. If the matching database entry has already been output, then control flow branches back to step 154. If the database entry has not been output, then control flow branches to step 162 where the location of the database entry from the table is used to retrieve the content of the entry from database 134 and output it to output display 140.

As noted above, the content of entries in database 134 can take various forms. Table 1, for example, contains a CONTENT TYPE field defined by the content developer. As is also noted above, the user can input user preferences via user interface 136 that indicate the type of entries that the user wants output from the database 134. For instance, the user may select one or a combination of historical information, geological information or ecological information. The values in Table 1 for the CONTENT TYPE field correspond to the preference values available to the user. Step 160 of process 150 in FIG. 3 is modified to include an additional check of user preference values against the content type field for the matching database entry. If the CONTENT TYPE of the database entry matches one of the user preferences and the entry has not previously been played, then database processor 130 outputs the entry to output display 140.

Another embodiment of the present invention can be used to collect information regarding the movements of the user of the device. In this embodiment, the present invention not only outputs information to the user regarding a business, such as the location of a nearby restaurant or hotel, but also collects data recording whether the user visited the business.

Figure 4:
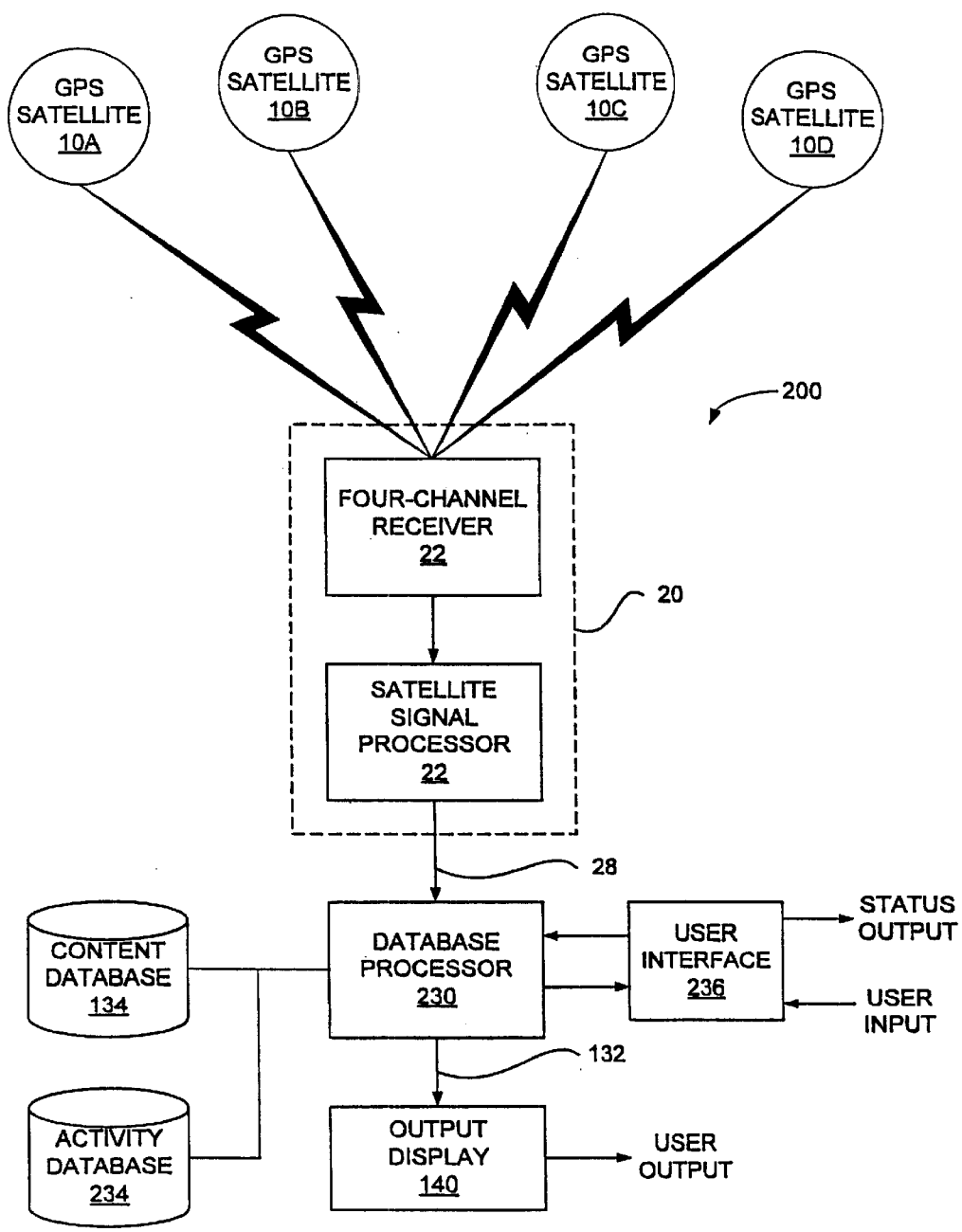
FIG. 4 is a functional block diagram that illustrates an architecture according to one embodiment of the present invention.

FIG. 4 is a functional block diagram that illustrates an architecture according to this embodiment of the present invention. GPS device 200 of FIG. 2 includes database processor 230 that is coupled to both content database 134 and activity database 234. User interface 236 is configured to receive a user command to initiate collection of activity data by database processor 230 and that is stored in activity database 234 for later download. Activity database 234 contains entries for business places and each place corresponds to a cell, similar to the cells of the first table of database entries.

When database processor 230 is activated to collect data, it performs processing in addition to that described above with respect to FIG. 3. Database processor 230 receives the current latitude and longitude from GPS receive and decode circuit 20 and searches the second table of database entries for a matching entry. When a matching entry is found, the database entry is updated to indicate that the location was visited. Additional information can be collected, such as a start time and a timer can be started to measure the duration of the visit, which can also recorded in the database entry.

Figure 5:
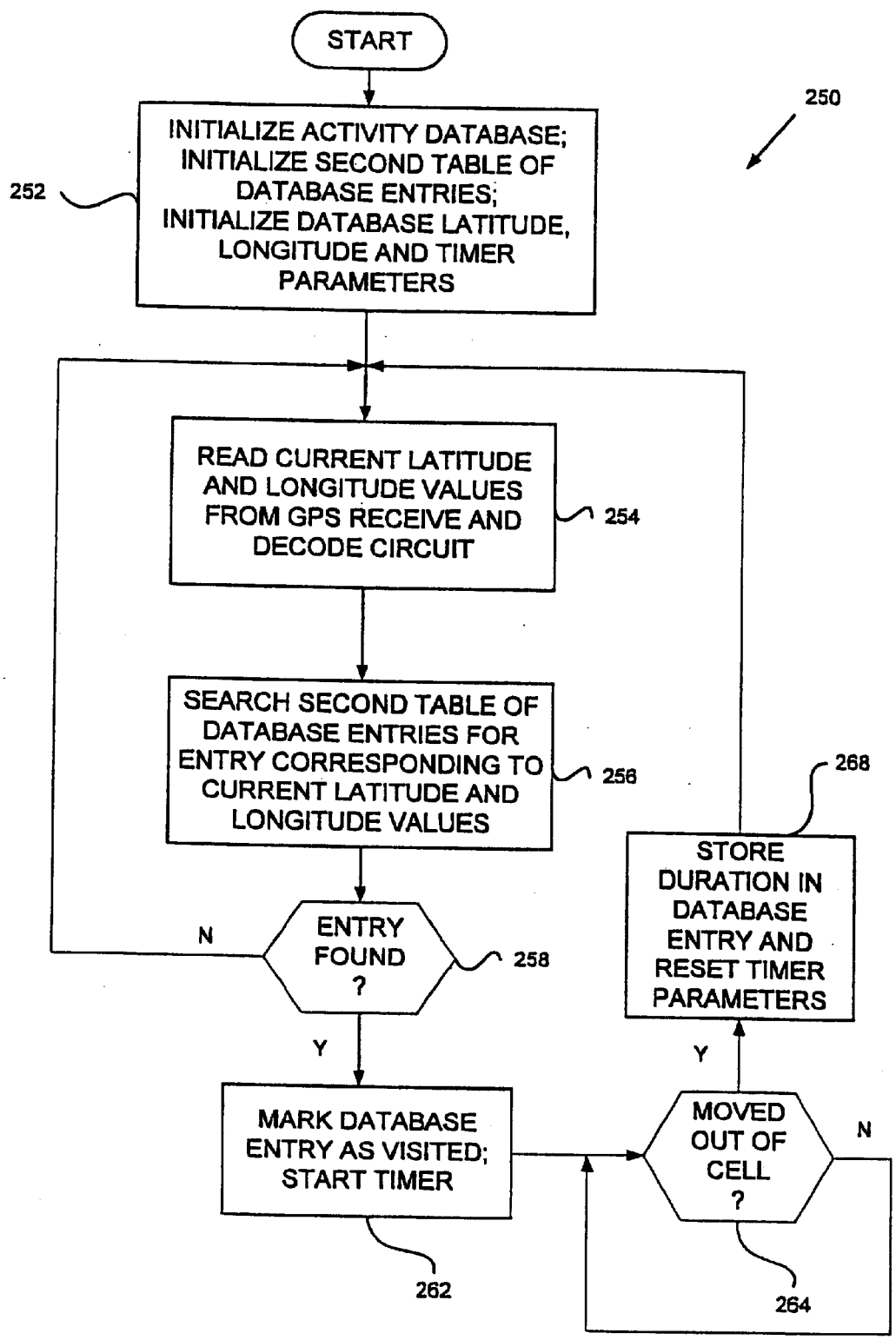
FIG. 5 is a control flow diagram illustrating an embodiment of a process for data collection according to the present invention.

FIG. 5 is a control flow diagram showing an embodiment of a process 250 for data collection as just described. At step 252 in process 250, activity database 234 is initialized for use and a second table of database entries is initialized that contains an entry for each business place, or other locations of interest, for which data is desired. The second table of database entries can be a pre-constructed table read in from database 234 or created from the entries in database 234. Database parameters for latitude, longitude and timers are also initialized at this step.

At step 254, the current values for latitude and longitude are read from the output of GPS receive and decode circuit 20. The current values for latitude and longitude are then used at step 256 to search the second table of database entries for a matching entry. If no entry is found, then control flow branches at step 258 back to step 254 to again read the current latitude and longitude values. If an entry is found, then control flow branches to step 262 where the matching database entry is updated, either in the second table or in activity database 234, to indicate the that location was visited.

In addition, a timer can be started at step 262 to measure the duration of the time that the device user resides in the cell for the matching database entry. The current latitude and longitude values output from GPS receive and decode circuit 20 are monitored at step 264. When the user leaves the cell, control flow branches to step 268 where the timer is stopped and the timer value for the database entry recorded, either in the table or in activity database 234. Control flow then returns to step 254 for further processing of current latitude and longitude values.

This embodiment of a GPS system according to the present invention provides for the collection of highly accurate market research data. The device can automatically capture the user's itinerary including movements and stopping points by recording the time, date, and location that the user enters cells. The information regarding the user's itinerary can then be downloaded from the device and reported to the owners of the business places for purposes such as marketing and advertising. This information provides a means to verify patronage of business such as hotels and gas stations and, in so doing, provide a basis for measuring the effectiveness of advertising, including advertising that may be output from database entries in content database 134.

Figure 6:
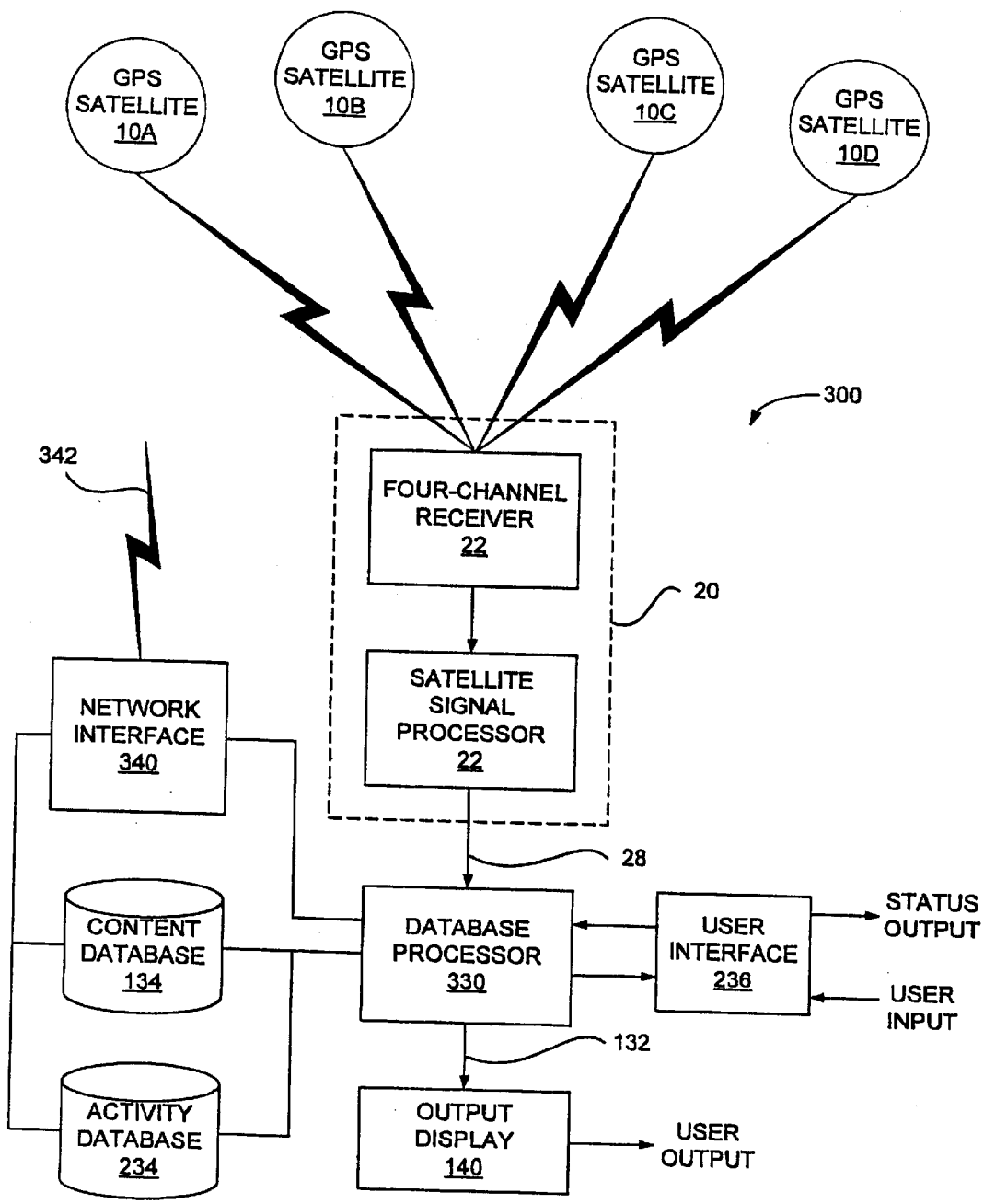
FIG. 6 is a functional block diagram that illustrates an architecture according to another embodiment of the present invention.

FIG. 6 is a functional block diagram illustrating yet another embodiment of an architecture for a GPS device 300 according to the present invention. In device 300, database processor 330 is coupled to network interface 340 that supports a communication link 342, such as a wireless link, to a network. Network interface 340 communicates over communication link with a content server device attached to the network.

Database processor 330 sends a content query to the network interface 340 that includes the current latitude and longitude from the GPS receive and decode circuit 20 and the user preferences from user interface 236. Network interface 340 will relay the content query to the server via communication link 342. If the content server has content for a cell corresponding to the content query, then it will respond by downloading the content over link 342 to network interface 340, which stores the downloaded content in content database 134 for output to the user and relays the reply to database processor 330.

Figure 7:
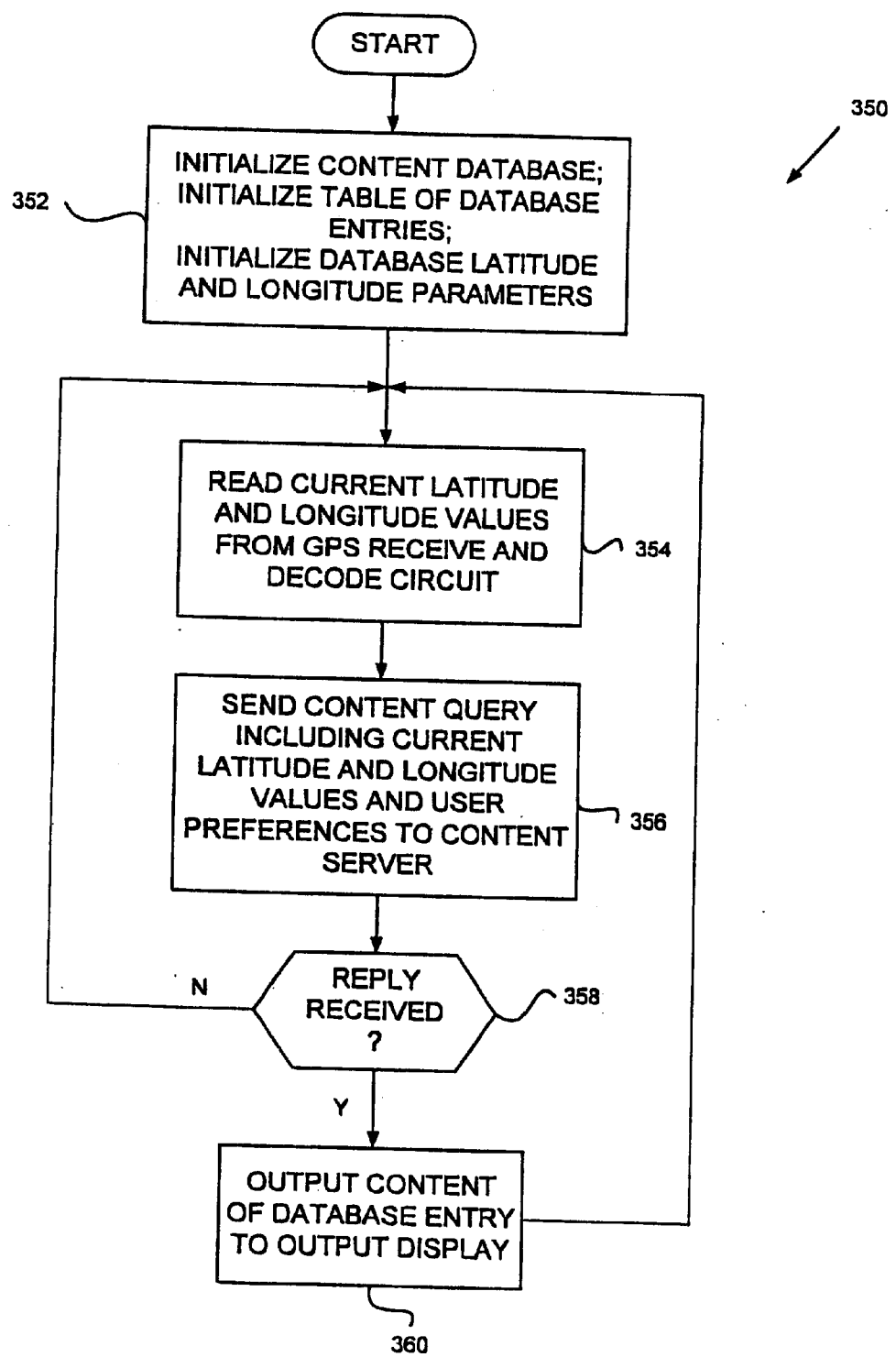
FIG. 7 is a control flow diagram illustrating an embodiment of a process for obtaining content from a content server according to the present invention.

FIG. 7 is a control flow diagram illustrating an embodiment of a process 350 for obtaining content from a content server as just described. At step 352, the content database 134 and table of database entries are initialized by database processor 330 along with the latitude and longitude parameters. At step 354, database processor 330 reads the current latitude and longitude values from GPS receive and decode circuit 20. At step 356, database processor 330 formats a content query containing the current latitude and longitude values and user preferences and sends the content query through network interface 340 to the content server. Database processor 340 then waits for a reply. If no reply from the content server is received, then control flow branches back to step 354. If a reply from the content server is received, then the content of the database entry sent by the content server is output to the user at step 360 and control flow returns to step 354. Note that process 350 can be combined with elements of processes 150 and 250.

Likewise, network interface 340 is coupled to activity database 234 and can upload database entries from the activity database to the content server for processing by the content provider. Database entries can be uploaded in a variety of ways, such as in response to a query from the content server over network interface 340, when the network interface 340 is idle, at timed intervals, or under user command through user interface 236.

This system provides for the establishment of a centralized inventory of content that can provided to users on an as-needed basis. The architecture of GPS device 300 can reduce the storage requirements for the content and activity databases 134 and 234 by downloading and uploading information, respectively, as needed. The architecture of GPS device 300 also allows the content for a cells to be changed in a server at a centralized location so that a content provider can update rapidly-changing information such as road conditions, weather, availability of sponsors' accommodations, or even luncheon specials at sponsors' restaurants.

Figure 8:
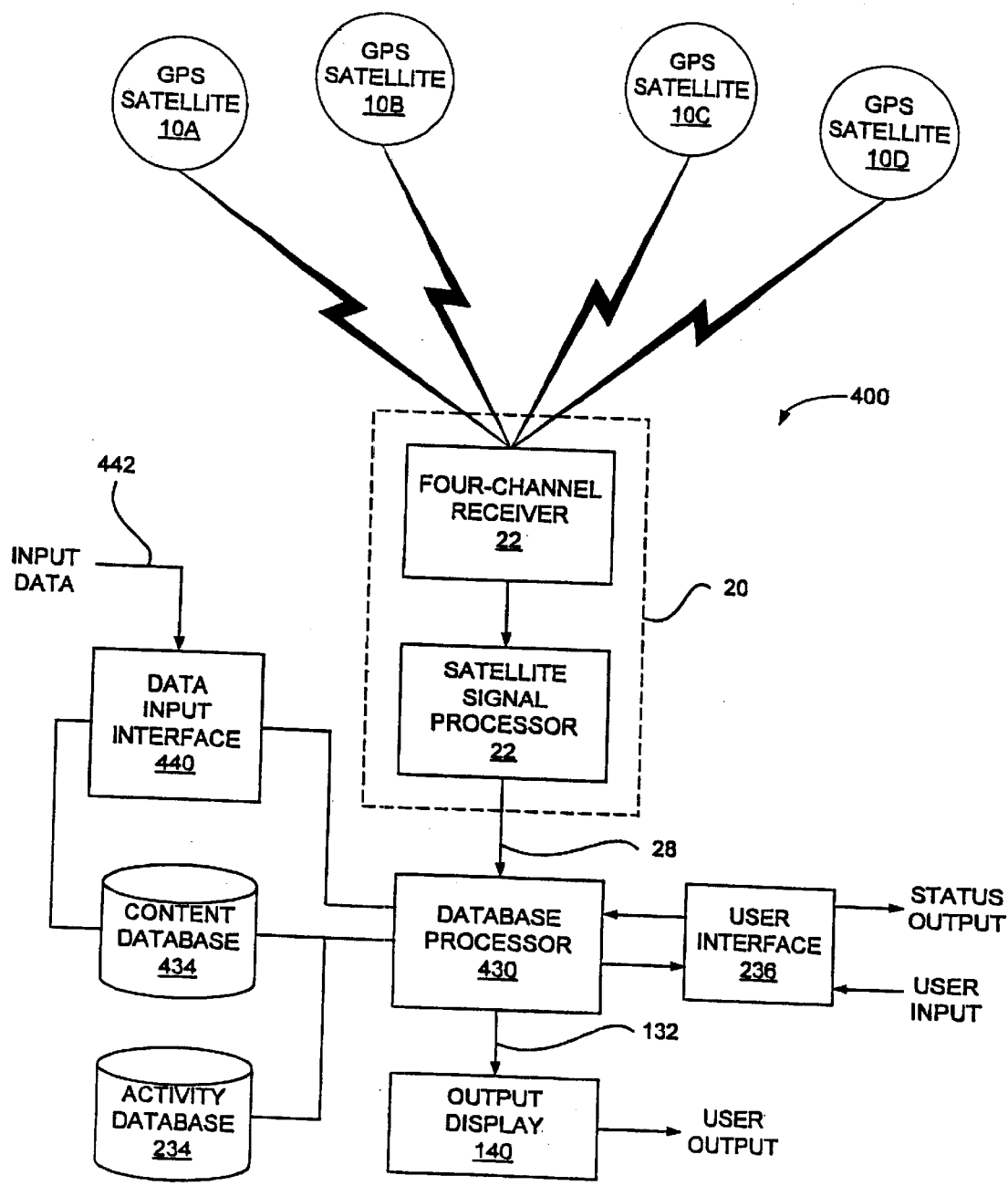
FIG. 8 is a functional block diagram that illustrates an architecture according to yet another embodiment of the present invention.

FIG. 8 is a functional block diagram illustrating yet another embodiment of an architecture for a GPS device 400 according to the present invention. In device 400, database processor 430 is coupled to data input interface 440 that receives data, such as video or audio input, provided by a user using a data input device, such as a video camera or microphone. Data input interface 440 receives the user input and stores in content database 434 under control of database processor 430. For instance, database processor 430 may cause data input interface 440 to record the user input, such as verbal narration, in response to a user command input via user interface 236. Alternatively, the database processor 430 can have a table of database entries indicating cells of interest, where the processor automatically causes the data input interface 440 to record the user input, such as video of the passing scene, when the output of GPS receive and decode 20 indicates that the GPS device 400 has entered the cell of interest.

Figure 9:
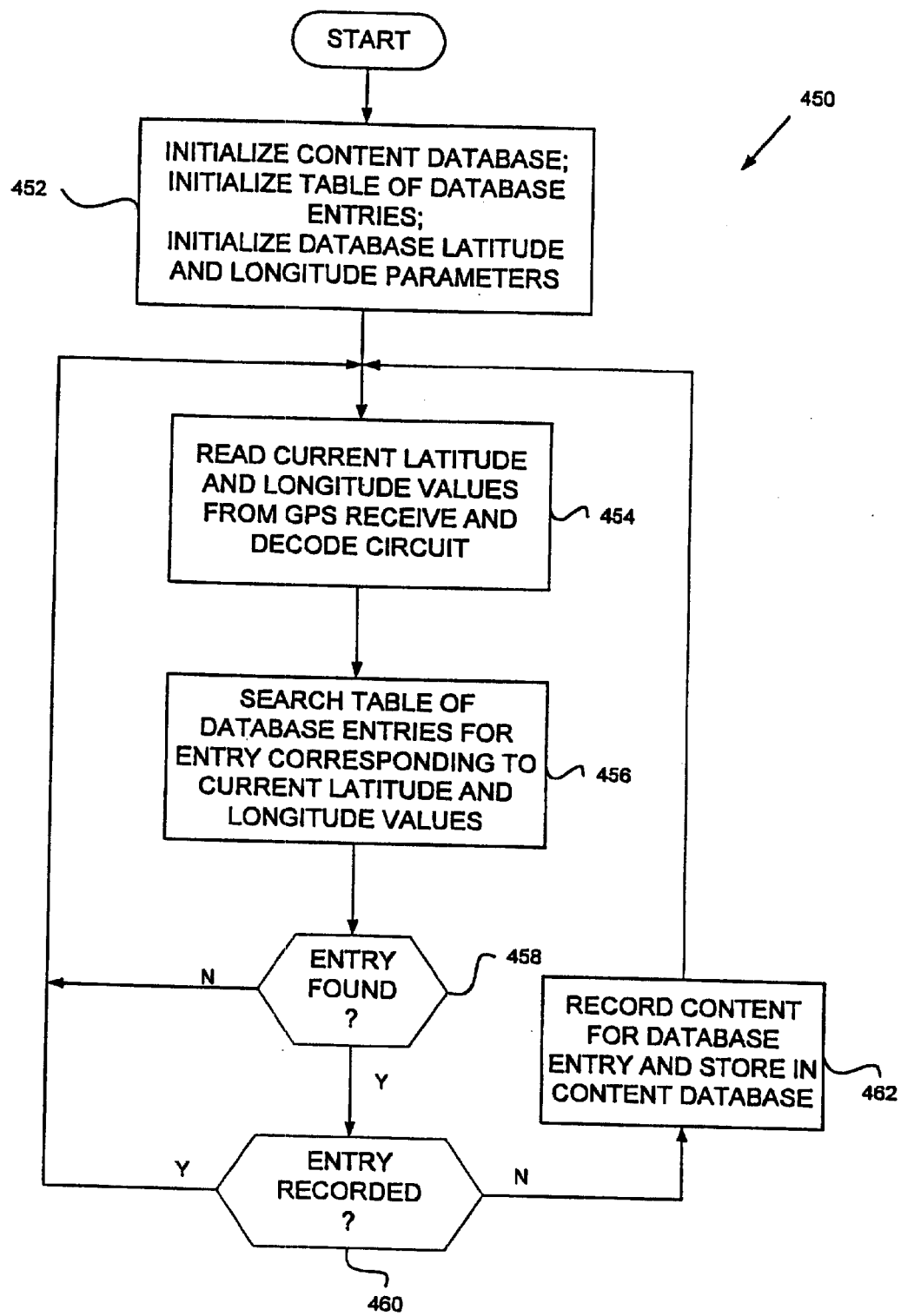
FIG. 9 is a control flow diagram illustrating an embodiment of a process for obtaining content for a content database according to the present invention.

FIG. 9 is a control flow diagram illustrating an embodiment of a process 450 for obtaining content for content database 434 as just described. At step 452, the content database 434 and table of database entries are initialized by database processor 430 along with the latitude and longitude parameters. At step 454, database processor 330 reads the current latitude and longitude values from GPS receive and decode circuit 20. At step 456, database processor 430 searches the table of database entries for an entry matching the current latitude and longitude values. If no matching entry is found, then control flow branches back to step 454. If a matching entry is found at step 458, then database processor 440 checks at step 460 to see if the entry has already been recorded. If the entry has been recorded, then control flow branches back to step 454. If the entry has not been recorded, then control branches to step 462 where database processor 440 causes the user input received at data input interface 440 to be stored in content database 434.

The resulting database entries in content database 434 provide a content developer with an image or other data regarding a covered area and the identification of cells. This process creates a uniquely efficient way to bring remote content providers into the development process because the content providers can do their work without being on-site. Moreover, information necessary to update the content can be developed quickly and inexpensively by relatively untrained personnel and reused as the topics covered by the content expand.

It should be understood that the programs, processes, methods, systems and apparatus described herein are not related or limited to any particular type of computer apparatus (hardware or software), unless indicated otherwise. Various types of general purpose or specialized positioning system, storage system, or computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

I claim:

1. A location sensitive method for outputting data from a database, the method comprising the steps of:

receiving a current position value;

searching a database for a database entry corresponding to the current position value; and if a corresponding database entry is found, outputting a contents of the corresponding database entry;

searching a second database for a database entry corresponding to the current position value; and if a corresponding database entry is found in the second database, marking the corresponding database entry as visited, where the step of marking the corresponding database entry as visited further includes the steps of:

starting a timer;

monitoring the current position value;

stopping the timer when the current position value no longer matches the corresponding database entry of the second database; and recording the timer value in the corresponding database entry of the second database.

2. A location sensitive database apparatus, the apparatus comprising:

a positioning system configured to receive geographical reference signals and, responsive thereto, generate a location signal indicating a geographical position of the positioning system;

a content database configured to stored database entries, each database entry corresponding to a geographic region and including machine readable data;

an output display configured to receive the machine readable data and output the machine readable data in a human recognizable format; and a database processor configured to receive the location signal from the positioning system and, responsive thereto, search the content database for a corresponding database entry where the geographic region of the corresponding database entry matches a current value of the location signal and, if the corresponding database entry is found, transfer the machine readable data for the corresponding database entry to the output display;

a user interface configured to receive and store a user preference value for output to the database processor, where each database entry further includes a content type value, and where the database processor is further configured to compare the user preference value to the content type value of the corresponding database entry and inhibit transfer of the machine readable data for the corresponding database entry when the user preference value does not match the content type value;

a data input interface coupled to the database processor and the content database, the data input interface being configured to receive input data and transfer the input data to the content database, where the database processor is further configured to receive a predetermined user command via the user interface and, responsive thereto, record the input data from the data input interface in the corresponding database entry in the content database; and a timer device coupled to the database processor and configured to generate a time signal, where each database entry further includes a time interval value, and where the database processor is further configured to compare the current value of the time signal to the time interval value of the corresponding database entry and inhibit transfer of the machine readable data for the corresponding database entry when the current value of the time signal does not match the time interval value.

* * * * *